(No Model.)

J. C. KLAUDER.
HOMINY MILL.

No. 268,691. Patented Dec. 5, 1882.

WITNESSES:
Harry Drury
Harry Smith

INVENTOR:
John C. Klauder
by his Attys
Howson & Sons

UNITED STATES PATENT OFFICE.

JOHN C. KLAUDER, OF PHILADELPHIA, PENNSYLVANIA.

HOMINY-MILL.

SPECIFICATION forming part of Letters Patent No. 268,691, dated December 5, 1882.

Application filed August 14, 1882. (No model.)

*To all whom it may concern:*

Be it known that I, JOHN C. KLAUDER, a citizen of the United States, and a resident of Philadelphia, Pennsylvania, have invented certain Improvements in Hominy-Mills, of which the following is a specification.

The object of my invention is to construct a mill for the rapid, effective, and continuous reduction of corn to the condition of hominy—an operation which requires the removal of the hulls from the grains of corn, the cracking of the grains into fragments, and the separation therefrom of the soft portions at the center or eye of each grain.

Figure 1:
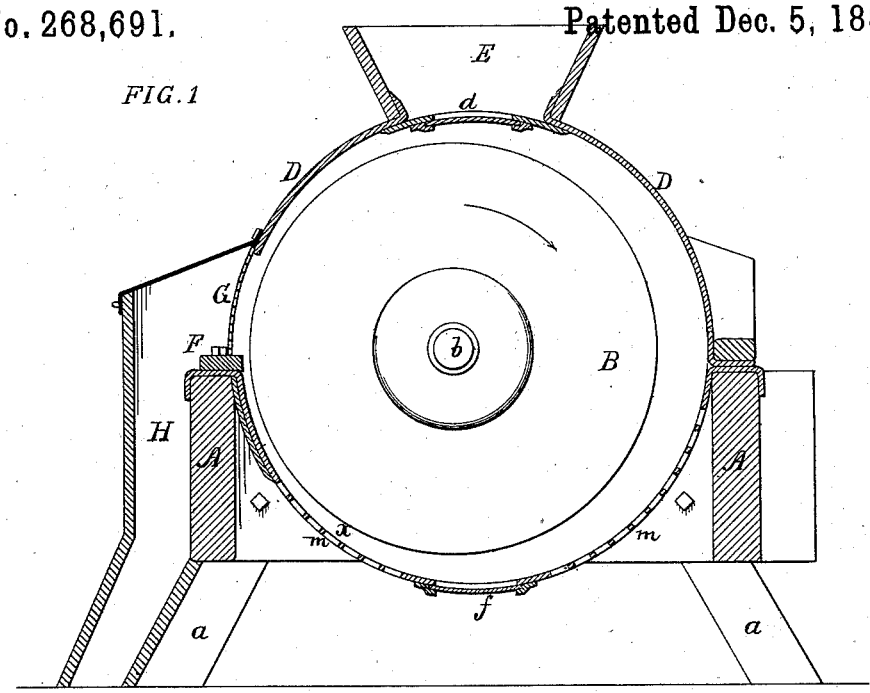
Figure 3:
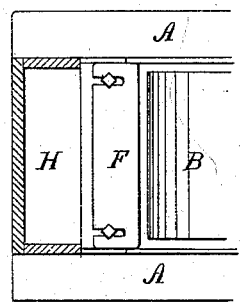
Figure 2:
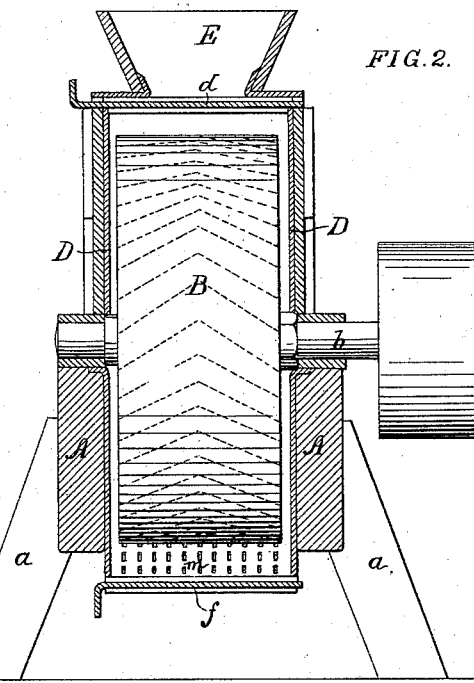

In the accompanying drawings, Figure 1 is a longitudinal section of my improved hominy-mill; Fig. 2, a transverse section of the same, and Fig. 3 a sectional plan view of part of the mill.

A is a frame, suitably mounted on legs $a$, and having bearings for the shaft or spindle $b$ of a burr-stone, B, which is contained within a casing, D, carried by the frame A, said casing being eccentric in respect to the stone, as shown in Fig. 1. At the top of the casing is a hopper, E, with valve $d$; and at one side of the casing, at or near the point where the stone makes its closest approach thereto, is an adjustable block, F, immediately above which is a perforated plate, G, which forms part of the casing D and closes the entrance to a spout, H, the latter discharging into any suitable receptacle. In the bottom or lower half of the casing D are formed perforations $m$, and this part of the casing is furnished with a valve, $f$, as shown. The perforations $m$ are of a finer character than those in the plate G.

The operation of the mill is as follows: The corn is fed continuously into the casing D through the hopper E. The stone being rotated in the direction of the arrow, the grains of corn are forced into the gradually-contracted space $x$ between the stone and casing, and are prevented from being carried around by the stone, which thus exercises an abrading effect upon them, the result of which is that the hulls of the grains and the soft portions at the center or eye of each grain are removed, the grains being broken or cracked by pressure against the block F, and the cracked grains finding their way between said block and the stone, and then through the perforated plate G into the spout H. The block F is adjustable from and toward the stone, so as to compensate for wear and regulate the size of the grains of hominy.

The openings in the lower part of the casing D serve to ventilate the interior of the casing and prevent the undue heating of the stone or of the contents of the casing, and said perforations also serve to permit the discharge of a portion of the hulls and floury portions of the corn.

The interior of the casing may be emptied at any time, if desired, by closing the hopper-valve $d$ and opening the lower valve, $f$.

The periphery of the stone may be plain, or may have a dress similar to that shown by dotted lines in Fig. 2.

The above-described mill is continuous in its action, simple in construction, and not so liable to get out of order as the usual cast-iron mills.

I claim as my invention—

1. The combination of the casing D, having an inlet for the corn, and a perforated discharge-plate, G, with a block, F, and a burr stone, B, arranged eccentrically in the casing D, as set forth.

2. The combination of the casing D, having an inlet for the corn, and a perforated discharge-plate, G, with the adjustable block F and the burr-stone B, arranged eccentrically in the casing, as set forth.

3. The combination of the casing D, having an inlet for the corn, a perforated discharge-plate, G, and perforations $m$ with the eccentric burr-stone B and block F, as set forth.

In testimony whereof I have signed my name to this specification in the presence of two subscribing witnesses.

JOHN C. KLAUDER.

Witnesses:
 HARRY DRURY,
 HARRY SMITH.